J. B. WHITING.
Grain Drill.
No. 51,768. Patented Dec. 26, 1865.
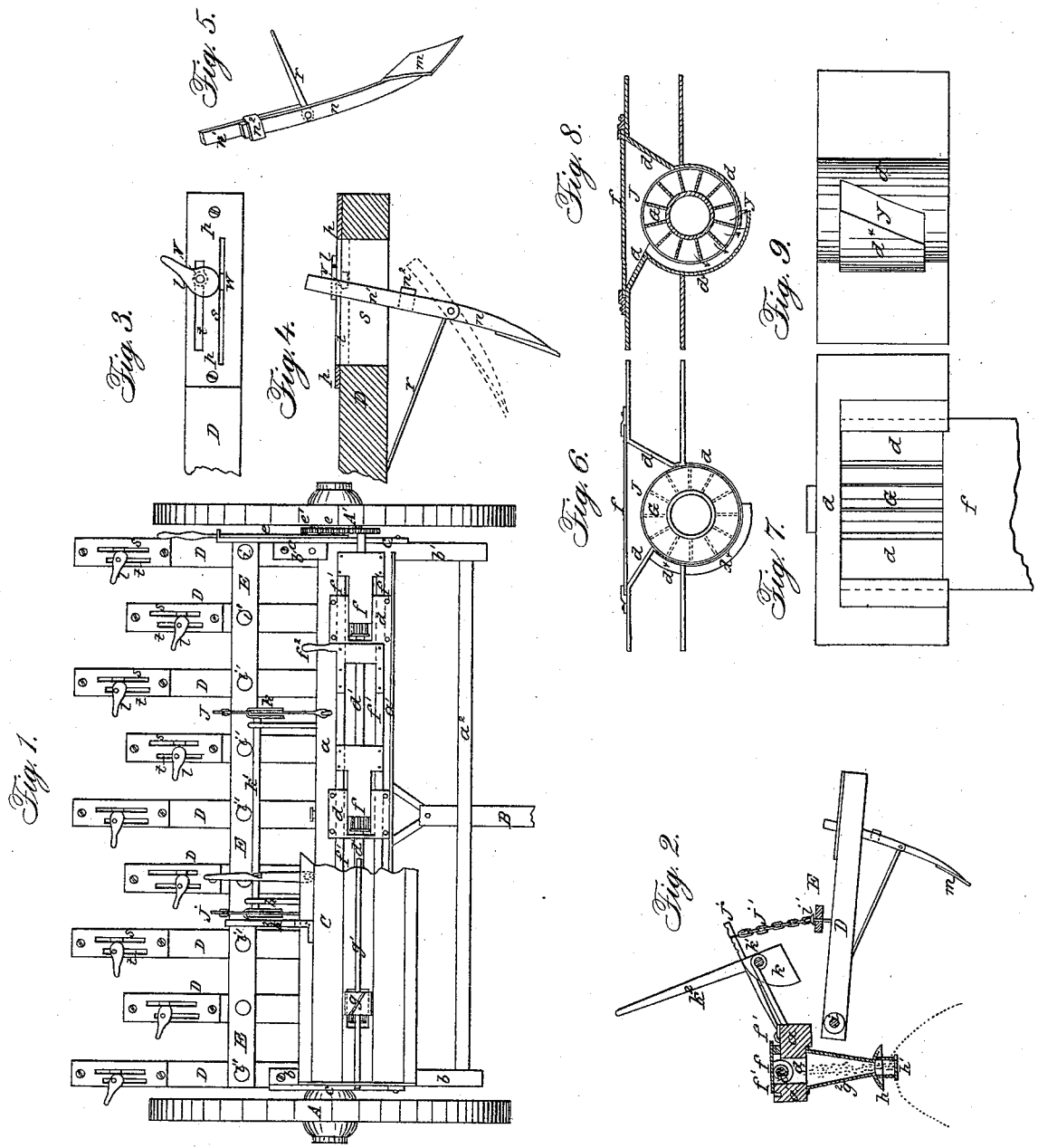
Witnesses:
Inventor:

UNITED STATES PATENT OFFICE.

J. B. WHITING, OF RIPON, WIS., ASSIGNOR TO HIMSELF AND EMERY MAPES.

IMPROVEMENT IN SEEDING-MACHINES.

Specification forming part of Letters Patent No. 51,768, dated December 26, 1865.

*To all whom it may concern:*

Be it known that I, J. B. WHITING, of Ripon, in the county of Fond du Lac and State of Wisconsin, have invented a new and Improved Broadcast Seed-Sower; and I do hereby declare that the following is a full, clear, and exact description thereof, reference being had to the accompanying drawings, making a part of this specification, in which—

Figure 1 is a plan view of the improved seeding-machine with a portion of the hopper and the agitator-shaft broken away. Fig. 2 is a view in detail, showing a sectional elevation of the contrivance for elevating the beams which carry the teeth. Figs. 3 and 4 show the method of securing the standards of the cultivator-teeth at any desired angle. Fig. 5 is a perspective view of one of the jointed standards of the drill-teeth. Figs. 6, 7, 8, and 9 are views of the devices for dropping the seed from the hopper.

Similar letters of reference indicate corresponding parts in the several figures.

The nature of my invention consists in a novel mode of constructing and bracing the standards of the cultivator-teeth and applying these standards to their respective drag-bars, whereby the teeth and standards can be rigidly secured at any desired angle by means of sliding eccentric levers. At the same time the lower ends of the teeth are free to move forward on pivots when the machine is moved backward, as will be hereinafter described.

It also consists in raising or depressing all the drag-bars and their teeth simultaneously by means of a lever which is applied to grooved eccentrics that operate upon pivoted supporting-arms, as will be hereinafter described.

It also consists in the employment of rotating auger-shaped agitators, which are arranged within the hopper and over each seed-discharge for the purpose of more effectually preventing the clogging of the seed at said pivots, as will be hereinafter described.

It also consists in regulating the discharge of the seed from the hopper by means of adjustable slides, which are provided with perpendicular guards, and which are adapted to slide in grooves in the top of the seed-case, as will be hereinafter described.

It also consists in the employment of revolving many-chambered cylinders within cylindrical cases, which have depressions or seed-passages formed in them that discharge the seed from diagonal openings arranged and operating substantially as will be hereinafter described.

It finally consists in the employment of tubes which are provided with inverted cup-shaped flanges and horizontal scattering-plates on their lower ends for the purpose of uniformly distributing the seed after they fall from the seed-cases, as will be hereinafter de-scribed.

To enable others skilled in the art to understand my invention, I will describe its construction and operation.

In the accompanying drawings, A A' represent two carriage-wheels, which turn upon short axles that are secured to the sides of the main frame of the machine. This frame consist of three parallel beams, $a\ a'\ a^2$, which are secured at their ends to two longitudinal beams, $b\ b'$. The tongue or draft-pole B is secured to the transverse beams $a\ a^2$, and is suitably braced by a forked connection on its rear end. The short axles of the carriage-wheels are secured to or cast with plates $c\ c$, which are bolted to the sides of the side beams, $b\ b'$, and to the forward ends of these plates the forward corners of the hopper C are pivoted, so that this hopper can be swung over when it is desired to have access to the seed-cases or their revolving seed-distributers, that are applied between the two parallel beams $a\ a'$, as clearly shown in Figs. 1 and 2.

The cylindrical seed-cases $a\ a\ a$ have flanged supports formed on them, by means of which they are secured to the two beams $a\ a'$, so as to be supported between these beams. Within these cases are revolving seed-cups, which, together with the construction of the cases, will be hereinafter fully described.

The seed-cups or cupped cylinders are secured to a shaft, $d'$, that has its end bearings upon the longitudinal side beams, $b\ b'$, and that end of this shaft which projects from the outside of beam $b'$, (shown in drawings, Fig. 1,) carries a spur-wheel, which is driven by means of a spur-wheel, $e$, on the hub of the carriage-wheel A', acting through the medium of a spur-wheel, $e'$, on a movable lever, $e^2$. By adjusting the lever $e^2$ the wheel $e'$ can be thrown into or out of gear and the motion of the shaft $d'$ stopped or started at pleasure while the machine is drawn along.

The seed-cases are provided with sliding covers $f$, which are secured to two parallel sliding rods, $f'\ f'$, that are arranged upon the two beams $a\ a'$ so as to move beneath the upper flanges of the seed-cases, as shown in Fig. 1. A handle, $f^2$, is secured to the sliding rods $f'\ f'$ near one side of the machine for the purpose of enabling a person to adjust the sliding covers for regulating the discharge of the seed from the hopper.

The hopper-bottom is covered by a plate, which has openings through it arranged over the openings into the seed-distributers. Over these openings I arrange agitators similar to $g$, which consists of plates or rings secured in an oblique position around a shaft, $g'$, that has its bearings in the ends of the hopper. One end of this shaft projects out from one end of the hopper and carries a spur-wheel, (not shown in the drawings,) which engages with the wheel on the shaft $d'$. These agitators operate somewhat like propellers, and they move the seed toward one end of the hopper, as will be hereinafter further explained.

Beneath each one of the seed-cases I apply tubes $g^2$, which may be made conical or straight. I prefer the conical tubes shown in Fig. 2. The upper ends of these tubes are secured to the bottom sides of the two beams $a\ a'$, and their lower ends have inverted flanges or cups $h$ formed on them, beneath which disks $h'$ are suspended, upon which latter the seed fall and are scattered in all directions, so as to be distributed upon the ground. The flanges $h$ on the seed-tubes serve as guards to prevent the seed from being blown about before they fall upon the distributing-plates $h'$.

A shaft, $i$, extends across the machine, and has its bearings in the side plates, $c\ c$, below the beam $a$, as shown in Fig. 2. To this shaft the drag-beams D D are pivoted, so that their rear ends will rise and fall freely. These beams are all connected to a transverse bar, E, by means of pins $i'\ i'$, as shown in Figs. 1 and 2, and this bar is attached to arms $j\ j$ by means of chains $j'\ j'$, which can be shortened or lengthened at pleasure, as occasion requires. The arms $j\ j$ are pivoted on top of the beam $a$, and are supported upon grooved eccentrics $k\ k$, which are secured to a rock-shaft, $k'$, that has its bearings in arms that project from the rear side of the beam $a$. To one of the eccentrics $k$ a lever, $k^2$, is applied, by means of which the beams or drag-bars D can be elevated or depressed.

To each one of the drag-bars D a tooth, $m$, is attached so that it can be adjusted and rigidly secured at any desired angle with respect to the surface over which it is drawn.

As all the teeth are applied to their respective drag-bars in precisely the same manner, I will describe the construction and application of one tooth, and for this purpose refer to Figs. 3, 4, and 5.

Two longitudinal slots, $s\ t$, are formed near the rear end of the beam D, one of which extends vertically through it and the other only partially through it. Over these slots a plate, $p$, is affixed, which is correspondingly slotted; but before applying this plate a pin, $v$, is inserted through its slot $t$, so that the head of the pin will be beneath the plate, as shown in dotted lines, Figs. 3 and 4. A lever, $l$, having a rounded head on one end is eccentrically secured to the pin $v$, so that this lever will be allowed to turn with the pin or to be moved backward in a direction with the length of the slot.

The tooth $m$ is secured on the lower end of a standard, $n$, in any suitable manner, and this standard is pivoted at an intermediate point between its ends to a brace-rod, $r$, which is secured at its forward end to the beam D. The upper section, $n'$, of the standard passes through the vertical slot $s$, and is also pivoted to the rear end of the brace-rod $r$, as clearly shown in Fig. 4. The upper end of this section $n'$ is secured at any desired angle to its beam D by means of the eccentric lever $l$, by turning which it will crowd the upper end of the said section firmly against one side of the slot through the beam and hold it firmly.

As the lever $l$ can be moved forward or backward, it will be seen that the section $n'$ can be secured in any desired position. When thus secured the lower section, $n$, will assume a similar angle in consequence of its upper end entering a stop-guard, $n^2$, on the upper section, as shown in Fig. 5. When the machine is moved backward the teeth will be pitched forward, as illustrated by dotted lines in Fig. 4, moving about their jointed connection and leaving their stop-guards, and when the machine is again moved forward the teeth will assume their former positions.

In Figs. 6, 7, 8, and 9 I have represented the contrivance for dropping the seed from the hopper, which I have above referred to. The seed-dropper G consists of a number of radial plates, which are secured to a cylindrical hub so as to form, in conjunction with heads at the extremities of these plates, a number of seed-cells which are of a uniform size. This dropper is arranged to fit snugly within a cylindrical case, $d$, and to rotate therein. This case has a flaring opening leading into its upper side, which is furnished with a slide, $f$, that has a vertical guard-plate, J, on one end, the lower edge of which guard fits over the edges of the partitions which form the seed-cells. By adjusting the slide $f$ a greater or less opening can be allowed into the case $d$ for the admission of the seed from the hopper, thus regulating the flow of the seed from the hopper.

On one side of the seed-case $d$ a channel, $d^4$, is formed, which terminates at or near the bottom of this case and past a vertical plane drawn through its center in an oblique opening, $y$, (shown in Figs. 8 and 9,) from which opening the seed are discharged. By means of the channel $d^4$ in the case $d$ the seed will be discharged in considerable quantities within the case, so that there will be no seed carried past the opening $y$, notwithstanding the seed-cup cylinder be rotated very rapidly.

Having thus described my invention, what I claim as new, and desire to secure by Letters Patent is—

1. The eccentric lever $l$, sliding in slot $t$, in conjunction with the standard playing through the vertical slot $s$ of the beam D, substantially as described.

2. The stop-guards $n^2$, applied to the upper sections, $n'$, of the tooth-standards, substantially in the manner and for the purposes described.

3. The two jointed sections $n\ n'$, united to the brace-rod $r$ and connected to the drag-bar D, substantially as described.

4. The combination of the pivoted notched arms $j\ j$, eccentrics $k\ k$, rock-shaft $k'$, drag-bars D D, and lever $k^2$, substantially in the manner described.

Witness my hand in the matter of my application for a patent on a broadcast seed-sower.

J. B. WHITING.

Witnesses:
WM. M. TAGGART,
H. S. TONN.